United States Patent
Ramthun

(10) Patent No.: US 10,746,905 B1
(45) Date of Patent: Aug. 18, 2020

(54) OPTICAL SYSTEMS WITH TOROIDAL FRESNEL LENSES

(71) Applicant: Rosemount Aerospace Inc., Burnsville, MN (US)

(72) Inventor: Kent Allan Ramthun, Shakopee, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 16/579,374

(22) Filed: Sep. 23, 2019

(51) Int. Cl.
| | |
|---|---|
| G02B 3/08 | (2006.01) |
| G02B 1/04 | (2006.01) |
| G03B 21/14 | (2006.01) |
| G03B 21/62 | (2014.01) |
| G03B 21/60 | (2014.01) |
| G03B 21/10 | (2006.01) |
| G03B 21/625 | (2014.01) |
| G03B 21/00 | (2006.01) |
| G01S 7/481 | (2006.01) |
| G01S 17/86 | (2020.01) |

(52) U.S. Cl.
CPC .............. *G02B 3/08* (2013.01); *G02B 1/041* (2013.01); *G03B 21/00* (2013.01); *G03B 21/10* (2013.01); *G03B 21/142* (2013.01); *G03B 21/60* (2013.01); *G03B 21/62* (2013.01); *G03B 21/625* (2013.01); *G01S 7/481* (2013.01); *G01S 17/86* (2020.01)

(58) Field of Classification Search
CPC ...... G03B 21/625; G03B 21/62; G03B 21/10; G03B 21/60; G02B 3/08
USPC ....................................................... 359/457
See application file for complete search history.

(56) References Cited

U.S. PATENT DOCUMENTS

| | | | | |
|---|---|---|---|---|
| 4,441,175 A * | 4/1984 | Shuman | ................ | G02B 27/40 369/44.24 |
| 6,023,356 A * | 2/2000 | Kihara | ..................... | G03H 1/24 359/22 |
| 6,256,150 B1 * | 7/2001 | Rosenthal | .............. | G03B 35/24 359/619 |
| 6,751,024 B1 * | 6/2004 | Rosenthal | ............ | G02B 3/0031 359/619 |
| 9,088,683 B2 * | 7/2015 | Chaleff | ............. | G06K 7/10722 |
| 10,359,545 B2 * | 7/2019 | Smith | ...................... | G02B 3/08 |

(Continued)

FOREIGN PATENT DOCUMENTS

| EP | 3144586 A2 | 3/2017 |
|---|---|---|
| EP | 3492960 A1 | 6/2019 |

(Continued)

OTHER PUBLICATIONS

Extended European Search Report dated Jun. 5, 2020, issued during the prosecution of European Patent Application No. EP 19216306.1.

*Primary Examiner* — Clayton E. LaBalle
*Assistant Examiner* — Kevin C Butler
(74) *Attorney, Agent, or Firm* — Locke Lord LLP; Scott D. Wofsy; Joshua L. Jones

(57) ABSTRACT

An optical system includes an illumination source. A lens is optically coupled to the illumination source for projecting a line image. The lens conforms to a curved profile, and the lens is a Fresnel lens. A method of projecting a line image includes generating illumination from an illumination source. The method includes focusing the illumination through a lens to form a line image, wherein the lens is as described above.

13 Claims, 3 Drawing Sheets

(56) References Cited

U.S. PATENT DOCUMENTS

2010/0254001 A1* 10/2010 Jang ................... H04N 13/346
359/479
2016/0011341 A1* 1/2016 Smith ..................... G02B 3/08
359/743

FOREIGN PATENT DOCUMENTS

| GB | 2234363 | * | 1/1991 | ............ G03B 25/00 |
| GB | 2234363 A | | 1/1991 | |

* cited by examiner

OPTICAL SYSTEMS WITH TOROIDAL FRESNEL LENSES

BACKGROUND

1. Field

The present disclosure relates to optical systems, and more particularly to illuminators such as used in LIDAR systems.

2. Description of Related Art

Cylindrical optics can be used to project a line image onto a field of view, e.g., for use in LIDAR systems. To create large projection angles, a large field of view is required as well as a large cylindrical lens. As the lens size and projection angles are scaled up, the images produced have good quality in the middle of the projected line, but the amount of blurriness on the ends of the line projections increases. The blurriness is caused by an aberration called Petzval curvature. This aberration limits the projection angles available to designers.

The conventional techniques have been considered satisfactory for their intended purpose. However, there is an ever present need for improved systems and methods for optical systems such as used in LIDAR illuminators and the like. This disclosure provides a solution for this need.

SUMMARY

An optical system includes an illumination source. A lens is optically coupled to the illumination source for projecting a line image. The lens conforms to a curved profile, and the lens is a Fresnel lens.

The lens can have a Fresnel lensing pattern oriented circumferentially about the curved profile. The curved profile can be a cylindrical profile. The cylindrical profile can have a semi-circular cross-sectional profile defined about a cylindrical axis. The Fresnel lensing pattern can define a radius of curvature that is different from that of the curved profile. The illumination source can have an elongate shape defined normal to a longitudinal axis that is aligned with the cylindrical axis. The illumination source can be positioned to intersect the cylindrical axis. The lens can be of a polymer material.

A method of projecting a line image includes generating illumination from an illumination source. The method includes focusing the illumination through a lens to form a line image, wherein the lens is as described above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
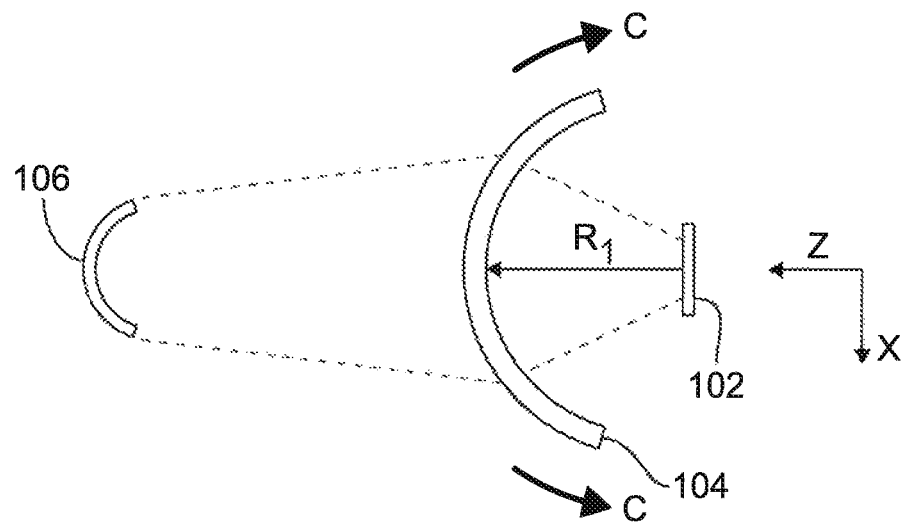
FIG. 1 is a schematic side elevation view of an embodiment of a system constructed in accordance with the present disclosure, showing the illumination source and the lens.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to for projecting line images, e.g., in LIDAR applications.

Figure 2:
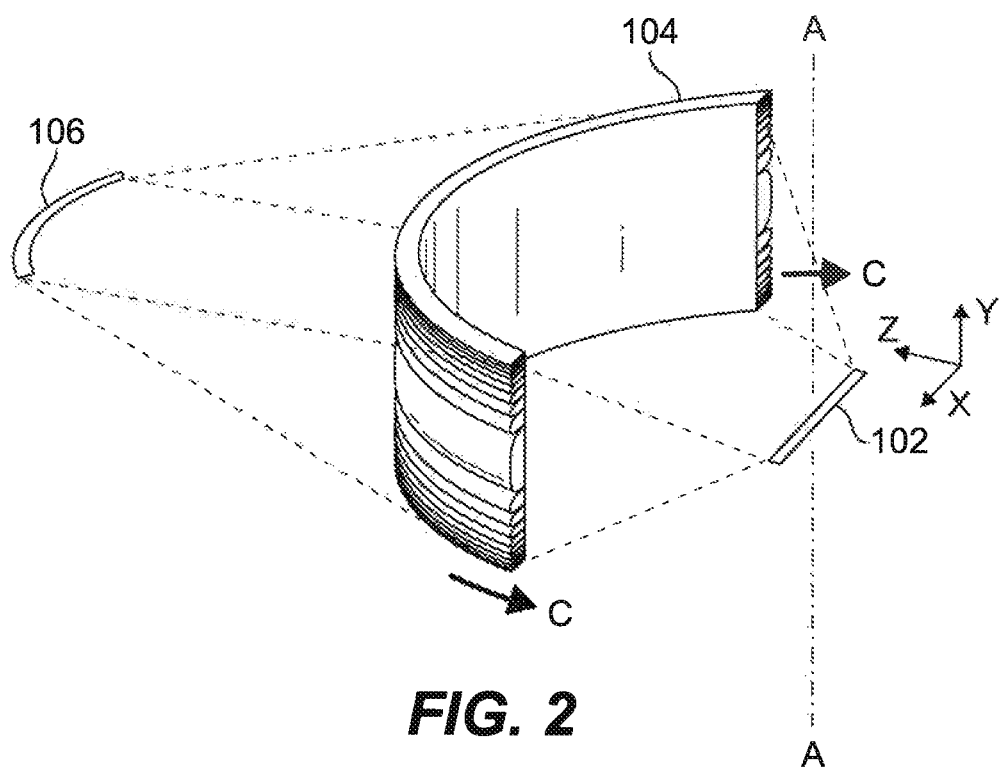
FIG. 2 is a schematic perspective view of the system of FIG. 1, showing the line image projected.

The optical system 100 includes an illumination source 102. A lens 104 is optically coupled to the illumination source 102 for projecting a line image 106. FIG. 1 schematically shows illumination rays emanating from the illumination source 102, and focused illumination rays from the lens 104 forming the line image 106. As shown in FIG. 2, the illumination source 102 has a linear profile with an elongated form factor extending along normal relative to the longitudinal axis A, and can be positioned to intersect the longitudinal axis A. Those skilled in the art will readily appreciate that while it is drawn straight in FIGS. 1 and 2, the illumination source 102 can be curved, and that the line image 106 can be straight rather than curved.

The lens 104 conforms to a curved profile, which curves around the longitudinal axis A. In addition to this curvature about the axis A, the lens 104 is also a Fresnel lens. The lens 104 has a Fresnel lensing pattern oriented to extend circumferentially about the curved profile in the direction C labeled in FIGS. 1 and 2. The curved profile of the lens 104 is a cylindrical profile. The cylindrical profile has a semi-circular cross-sectional profile, as shown in FIG. 1, defined about a cylindrical axis, is the same as the axis A.

Figure 3:
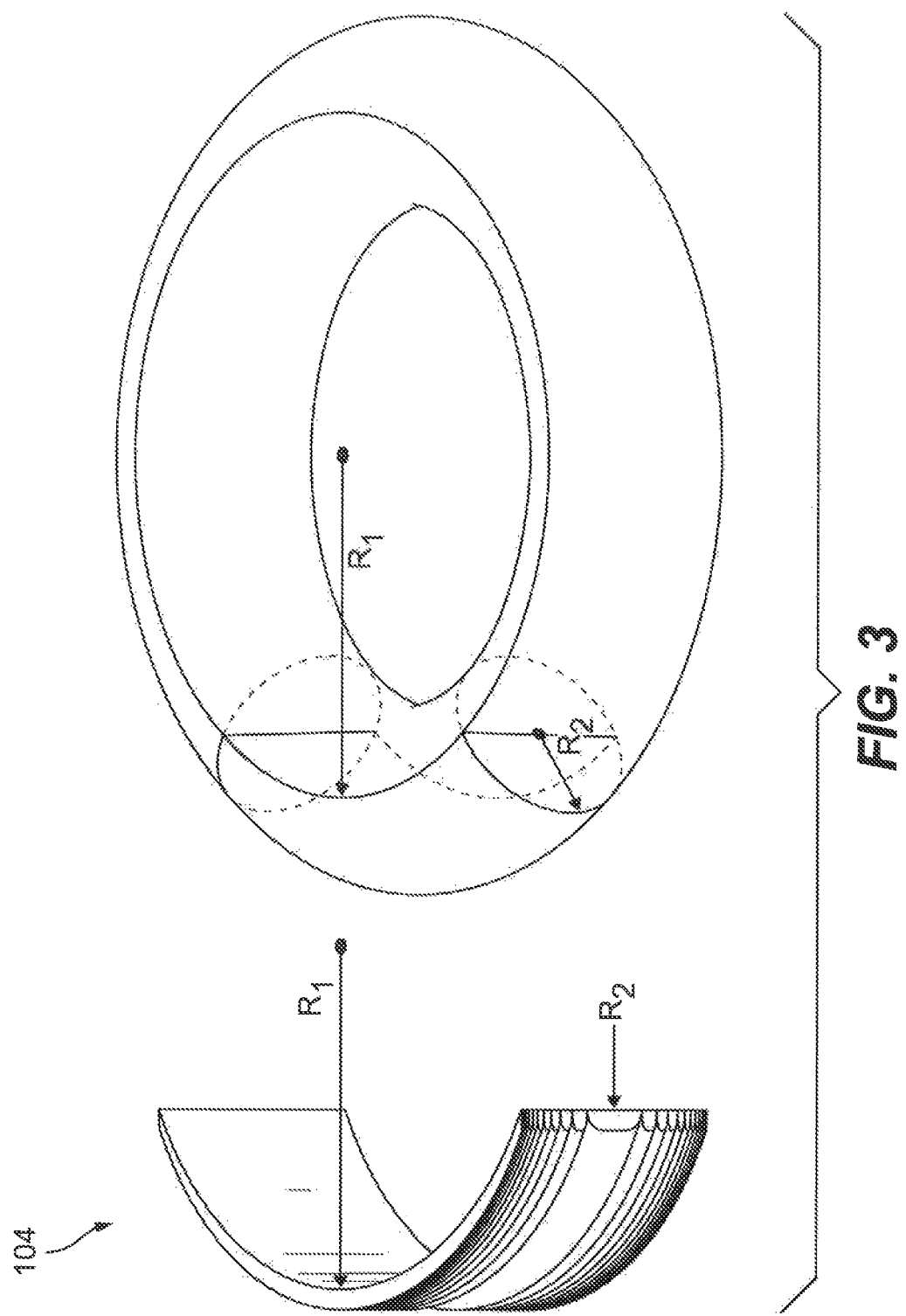
FIG. 3 is a schematic perspective view of the lens of FIG. 1, schematically showing the two radii of curvature of the lens.
Figure 4:
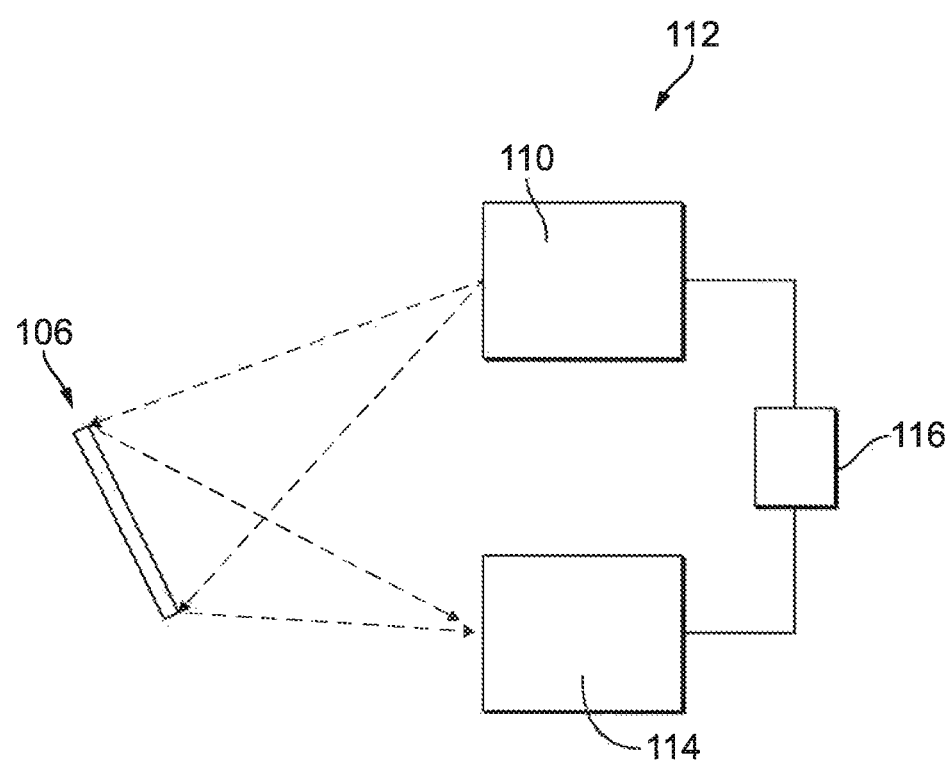
FIG. 4 is a schematic view of the system of FIG. 1, showing the system used in a LIDAR application.

With reference now to FIG. 3, the Fresnel lensing pattern defines a radius of curvature r2 that is different from the radius r1 of the curved, cylindrical cross-sectional profile of the lens 104. The toroid in FIG. 3 schematically shows r1 and r2 as they would be absent the Fresnel lensing pattern of the lens 104 to show how the Fresnel lensing pattern collapses the second radius of curvature r2 down into the semi-circular cross-sectional profile. The lens 104 can thus provide the optical properties of a toroidal lens but in a considerably more compact form factor. Since the lens 104 can be of a polymer material, and given its compact form, it can be made large while still being lightweight and inexpensive. The radius of curvature r1 can be configured to counteract petzval curvature that distorts line projections from cylindrical lenses, which can open up wider angle design configurations than cylindrical lenses allow.

The lens 104 and illumination source 102 can be housed in an illuminator 110 of a LIDAR system 112. The LIDAR system 112 can scan the line projection 106 across a scene, and the sensor component 114 can receive a return of the line image as indicated by the dashed line in FIG. 4. A controller 116 connected to the illuminator 110 and sensor component 114 can coordinate the scanning of the illuminator with the image capture of the returns by the sensor component 114. The data from the sensor component can be used to provide three-dimensional profile data indicative of the scene.

The lens 104 can be made starting with a flat plastic Fresnel lens, which although flat defines a cylindrical lens with the Fresnel cross-section shown in FIG. 3. The flat Fresnel lens should define the appropriate effective radius r2 (r2 is identified in FIG. 3). The lens can be bowed in the opposite axis (bowing the flat Fresnel lends around r1 as shown in FIG. 3) to mitigate Petzval curvature. With proper heating, this bowing can be made permanent. Those skilled in the art will readily appreciate that additional optics can be used in conjunction with the lens 102 for projecting or imaging.

The methods and systems of the present disclosure, as described above and shown in the drawings, provide for projecting line images, e.g., for LIDAR applications, with reduced cost and weight relative to traditional systems and methods. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An optical system comprising:
   an illumination source; and
   a lens optically coupled to the illumination source for projecting a line image, wherein the lens conforms to a curved profile, and wherein the lens is a Fresnel lens, wherein the lens has a Fresnel lensing pattern oriented circumferentially about the curved profile, wherein the Fresnel lensing pattern defines a radius of curvature that is different from that of the curved profile.

2. The optical system as recited in claim 1, wherein the lens has a Fresnel lensing pattern oriented circumferentially about the curved profile.

3. The optical system as recited in claim 1, wherein the curved profile is a cylindrical profile.

4. The optical system as recited in claim 3, wherein the cylindrical profile has a semi-circular cross-sectional profile defined about a cylindrical axis.

5. The optical system as recited in claim 4, wherein the illumination source has an elongate shape defined normal to a longitudinal axis that is aligned with the cylindrical axis.

6. The optical system as recited in claim 5, wherein the illumination source is positioned to intersect the cylindrical axis.

7. The optical system as recited in claim 1, wherein the lens is of a polymer material.

8. A method of projecting a line image comprising:
   generating illumination from an illumination source; and
   focusing the illumination through a lens to form a line image, wherein the lens conforms to a curved profile, and wherein the lens is a Fresnel lens, wherein the lens has a Fresnel lensing pattern oriented circumferentially about the curved profile, wherein the Fresnel lensing pattern defines a radius of curvature that is different from that of the curved profile.

9. The method as recited in claim 8, wherein the lens has a Fresnel lensing pattern oriented circumferentially about the curved profile.

10. The method as recited in claim 8, wherein the curved profile is a cylindrical profile.

11. The method as recited in claim 10, wherein the cylindrical profile has a semi-circular cross-sectional profile defined about a cylindrical axis.

12. The method as recited in claim 11, wherein the illumination source has an elongate shape defined normal to longitudinal axis that is aligned with the cylindrical axis.

13. The method as recited in claim 12, wherein the illumination source is positioned to intersect the cylindrical axis.

* * * * *